United States Patent [19]

Groves et al.

[11] Patent Number: 6,097,606

[45] Date of Patent: Aug. 1, 2000

[54] FINANCIAL TRANSACTION TERMINAL WITH LIMITED ACCESS

[75] Inventors: David Henry Groves, Adjala; Fraser Hardman, Mississauga; John Richard Spence, Newmarket; Ki Sheung Yuen, Brampton; Yiu Kong Wong, Richmond Hill, all of Canada

[73] Assignee: International Verifact Inc., Toronto

[21] Appl. No.: 09/084,999

[22] Filed: May 28, 1998

[51] Int. Cl.⁷ .............................. H05K 5/02; G06K 19/10; H02M 10/44
[52] U.S. Cl. ........................ 361/747; 361/732; 361/781; 364/208.1; 705/16; 705/17; 235/435; 235/472; 395/186; D14/100; D18/7
[58] Field of Search .................................. 361/680, 679, 361/686, 727, 681, 683, 728, 730, 732, 747, 760, 781; 364/705.06, 709.04, 710.04, 708.1; 705/1, 16, 17, 25; 235/435, 449, 472, 379, 380; 395/186; D14/100; D18/7

[56] References Cited

U.S. PATENT DOCUMENTS

| | | | |
|---|---|---|---|
| D. 403,667 | 1/1999 | Musha | D14/100 |
| 4,408,814 | 10/1983 | Takashi et al. | 339/59 M |
| 4,533,976 | 8/1985 | Suwa | 361/395 |
| 4,598,960 | 7/1986 | DiSanto et al. | 339/17 M |
| 4,614,406 | 9/1986 | Motoi | 350/334 |
| 4,922,191 | 5/1990 | Conover | 324/158 F |
| 4,953,113 | 8/1990 | Chadima, Jr. et al. | 364/708 |
| 5,023,824 | 6/1991 | Chadima, Jr. et al. | 364/708 |
| 5,055,660 | 10/1991 | Bertagna et al. | 235/472 |
| 5,155,659 | 10/1992 | Kunert | 361/380 |
| 5,202,817 | 4/1993 | Koenck et al. | 361/393 |
| 5,218,187 | 6/1993 | Koenck et al. | 235/375 |
| 5,294,782 | 3/1994 | Kumar | 235/462 |
| 5,313,053 | 5/1994 | Koenck et al. | 235/472 |
| 5,358,412 | 10/1994 | Maurinus et al. | 439/66 |
| 5,373,458 | 12/1994 | Bishay et al. | 364/708.1 |
| 5,386,106 | 1/1995 | Kumar | 235/462 |
| 5,410,141 | 4/1995 | Koenck et al. | 235/472 |
| 5,468,947 | 11/1995 | Danielson et al. | 235/472 |
| 5,512,738 | 4/1996 | Yuen | 235/382 |
| 5,515,303 | 5/1996 | Cargin, Jr. et al. | 364/708.1 |
| 5,539,193 | 7/1996 | Gibbs et al. | 235/472 |
| 5,657,201 | 8/1997 | Kochis | 361/686 |
| 5,764,200 | 6/1998 | Odmark | 345/2 |
| 5,805,416 | 9/1998 | Friend et al. | 361/686 |
| 5,831,819 | 11/1998 | Chacon et al. | 361/683 |
| 5,933,812 | 8/1999 | Meyer et al. | 705/15 |
| 5,949,378 | 9/1999 | Coveley | 343/702 |
| 6,023,147 | 2/2000 | Cargin, Jr. et al. | 320/114 |

FOREIGN PATENT DOCUMENTS

| | | |
|---|---|---|
| 0 128 672 | 12/1984 | European Pat. Off. . |
| 0818725A2 | 1/1998 | European Pat. Off. .......... G06F 1/16 |
| 91 05 960 U | of 0000 | Germany . |
| 2082814 | 3/1982 | United Kingdom ............ G06F 15/00 |
| WO 98 10368 | 3/1998 | WIPO . |
| WO 98/10368 | 3/1998 | WIPO .............................. G06K 7/10 |

*Primary Examiner*—Leo P. Picard
*Assistant Examiner*—Anatoly Vortman

[57] ABSTRACT

A financial transaction terminal is designed to receive both smart cards and debit cards and includes an access port for inserting or removing security modules such as SIM or SAM modules. A security switch arrangement is provided about the access port to protect the now accessible components of the terminal. Such a terminal provides the uncompromised physical security of a debit terminal with the flexibility and capabilities of a smart card terminal.

20 Claims, 3 Drawing Sheets

FINANCIAL TRANSACTION TERMINAL WITH LIMITED ACCESS

FIELD OF THE INVENTION

The present invention relates to financial transaction terminals capable of cooperating with smart cards stored in an accessible part of the access terminal. In particular, the application is directed to improvements in security of such terminals.

BACKGROUND OF THE INVENTION

Miniature smart cards compliant with the GSM 11.11 Standard, are commonly referred to as SIM (Security Identity Module) or SAM (Secure Access Module) cards. These devices have the same I/O pad configurations and capabilities as a standard ISO (CNet) smart card. The SIM or SAM cards, because of their small size, can be installed inside a financial transaction terminal for verification, password, registration, billing information or as an electronic purse, where monetary values can be transferred to and from the smart card. Both the SIM and SAM cards have special adapters for attachment to a circuit board for receiving the card and electrically connecting the card with the circuit board. In this way, the circuit board communicates directly with the card which is removable. The user, from time to time, may need to replace the SIM or SAM card and as such, requires access to the acceptors. For example, these cards can be used as an electronic purse which is replaced by the user, when the old one is full. Financial terminals which are smart card compatible have become increasingly popular for point of sale transactions. Similarly, debit fund transfer systems are becoming quite common. A single terminal which is compatible with both systems would be desired.

In a debit system, PIN entry is required as a means to identify the legitimate user. This PIN is protected by encrypting the PIN and data which is received by the unit or sent by the unit. In addition to this electronic coding, the common standards, such as INTERAC and VISA, require certain physical security to protect against unauthorized entry to the unit. Financial transaction terminals for debit card transactions have an electronic switch arrangement which shuts down the unit if the housing of the financial transaction terminal is separated exposing the enclosed circuitry and software.

The debit card security approach is desirable, however, it is also desirable to have a device with SIM or SAM cards for recordal of certain information directly in the device while allowing a user access to these cards. The present invention combines these two capabilities and while providing effective security for the financial transaction device.

SUMMARY OF THE INVENTION

A financial transaction terminal according to the present invention, is capable of cooperating with smart cards and includes a housing enclosing electronic circuitry which cooperates with a visual display and a key pad. The housing includes a slot entry for receiving a smart card and forming an electronic circuit between a received smart card and the enclosed circuitry. The key pad arrangement allows a user to enter information into the financial terminal and the terminal includes at least one accessible secure module located in an access port of the housing. The housing includes an electrical switch seal arrangement about the access port to prevent unauthorized entry into the financial transaction terminal through the port. The financial transaction terminal allows access to the secure module while the seal arrangement about the port provides additional security for the terminal.

According to an aspect of the invention, the device includes two security identity modules attached to the circuit board of the electronic circuitry.

According to a further aspect of the invention, the circuit board about the access port includes a series of connection terminals and the housing includes a zebra connector having alternating conducting and non conducting layers extending between the series of connection terminals and electrically connecting some of said terminals to form a security structure about the access port. The two security modules are readily accessible and the housing and the components of the terminal not exposed in the access port remain protected from authorized access through the access port.

According to yet a further aspect of the invention, the housing is a mechanically secured split housing having an electronic circuit for providing a signal if unauthorized entry to the terminal is attempted by separation of the split housing.

According to yet a further aspect of the invention, the two security modules are miniature SIM card acceptors or miniature SAM card acceptors.

According to yet a further aspect of the invention, the terminal accepts both debit or smart cards for completing financial transactions.

BRIEF DESCRIPTION OF THEE DRAWINGS

Preferred embodiments of the invention are shown in the drawings, wherein.

DETAILED DESCRIPTION OF THE PREFERRED EMBODIMENTS

Figure 1:
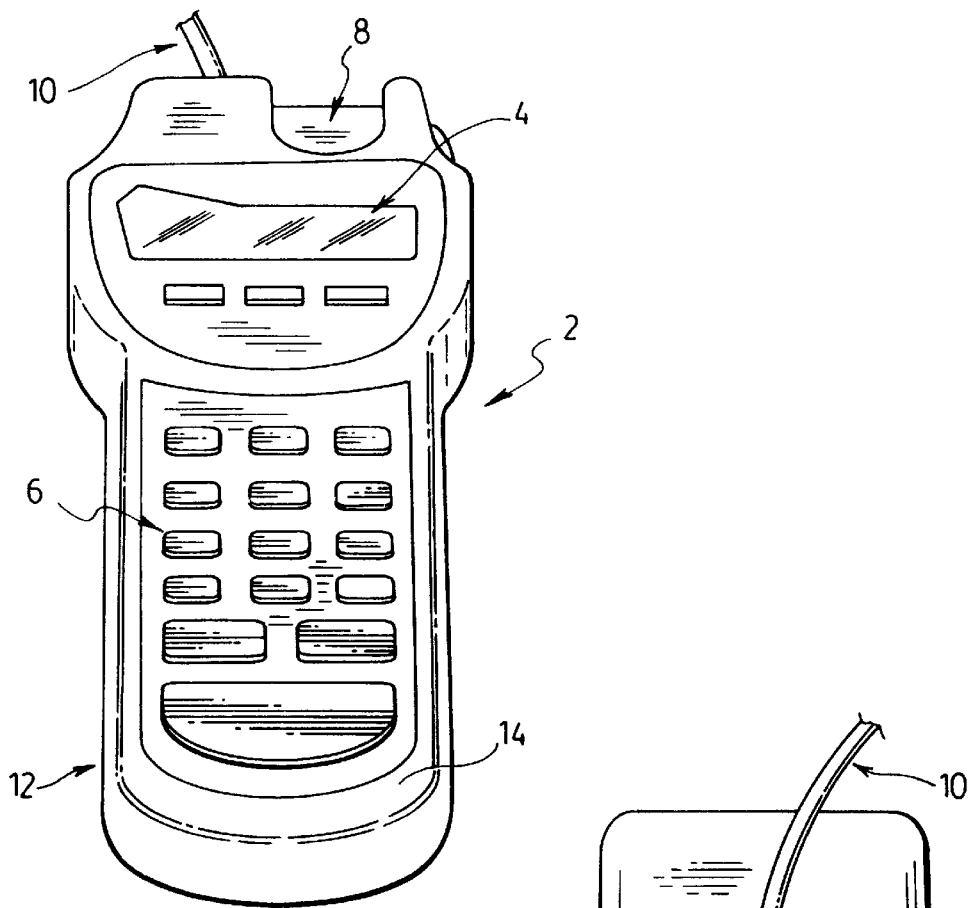
FIG. 1 is a perspective view of a financial transaction terminal.

FIG. 1 shows a financial transaction terminal 2 which can be used with both debit cards and smart cards. A debit card typically has a magnetic strip which is read by the financial transaction terminal, and the user then enters a PIN as part of the authorization process. The terminal electronically connects with a financial institute to complete the transaction. The transaction terminal 2 includes a visual display 4, a key pad 6, and a slot 8 for receiving the smart or debit card. The hand held terminal includes an electrical connection 10 to connect the terminal with other devices and for communication signals with a financial institute. These debit terminals are used at many point of sale counters. As part of the security, the transmitted and received signals are encrypted. The terminal then interprets the receiver's signal using software and encrypting keys maintained within the terminal. Physical security is provided to detect unauthorized access to the case of the terminal. In the event of detection, encoding information is deleted.

The terminal 2 has a housing generally shown as 12 which in this case, is a two-part casing having a front housing 14 and a back housing 16. Basically, the casing 12 is horizontally split into the two parts and suitable electronic circuitry arrangements can be provided to alert the terminal that the casing has been opened. The front and the back housing are typically mechanically secured and if released, the terminal detects this release and protects or eliminates any critical information.

Figure 2:
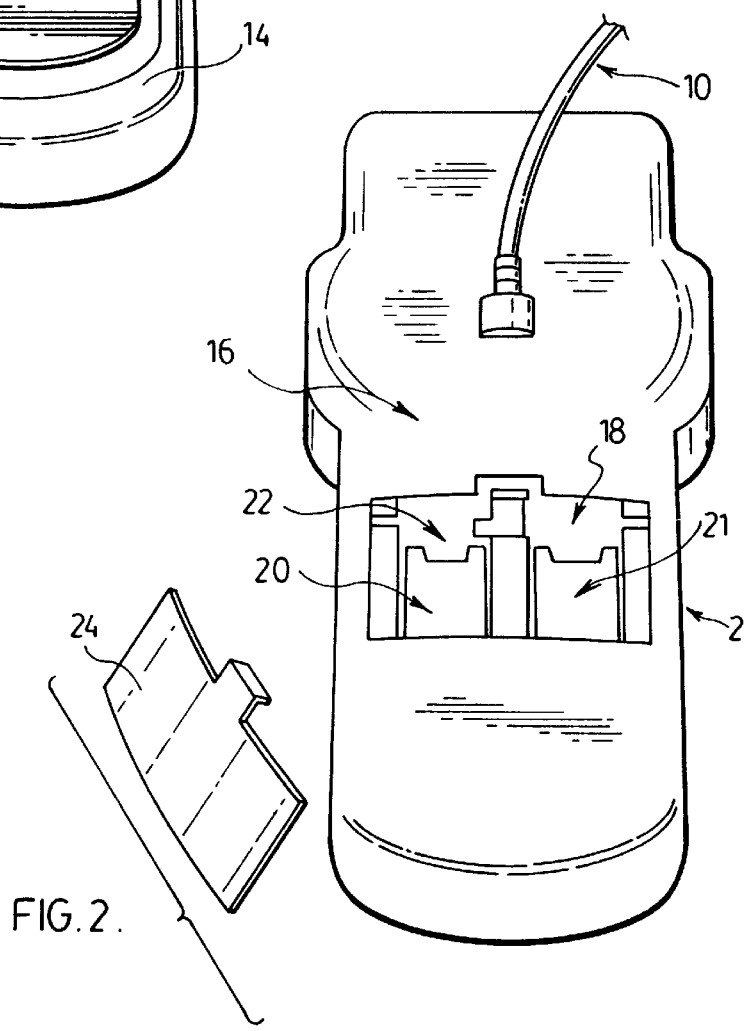
FIG. 2 is a perspective view of the rear of a financial transaction terminal showing an access port with the cover thereof removed.
Figure 3:
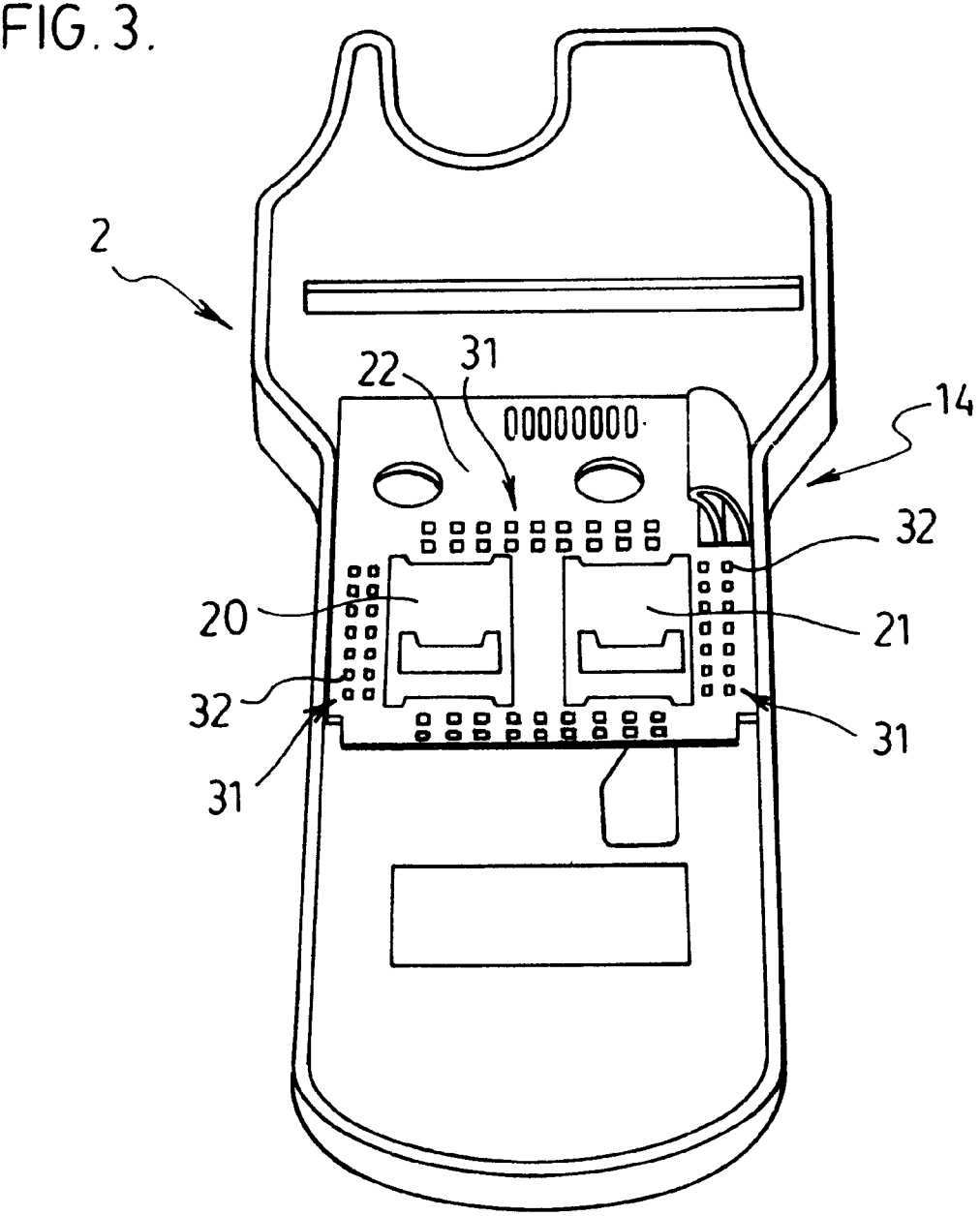
FIG. 3 is a rear perspective view with the back housing removed.

The back of the housing as shown in FIGS. 2 and 3, has an access port 18 which exposes part of the circuit board 22. SIM or SAM type acceptors 20 and 21 are secured on the circuit board 22 within the access port 18. The user, such as a merchant, has ready access to the acceptors 20 and 21 and can insert the appropriate SIM or SAM cards. A releasable cover 24 protects the access port 18. The SIM or SAM cards are examples of two of the most common user inserted modules that record information and financial transactions for example. Other modules can be used and the terminal is not limited to these particular modules.

The housing 16 includes side walls extending downwardly and contacting the circuit board 17 to provide a boundary area about the access port 18. In this way, access is provided to the port, yet access to the rest of the terminal is restricted. Critical parts are mounted on the circuit board 22 at a position which is interior to the housing and preferably remotely located, relative to the access port 18.

Figure 4:
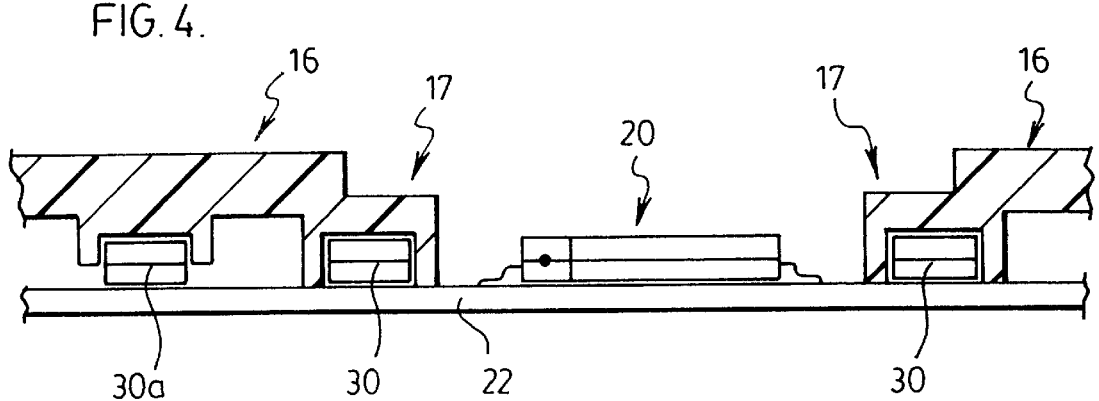
FIG. 4 is a partial sectional view showing part of the housing in contact with a circuit board which is an electrical connection with a miniature smart card acceptor.
Figure 5:
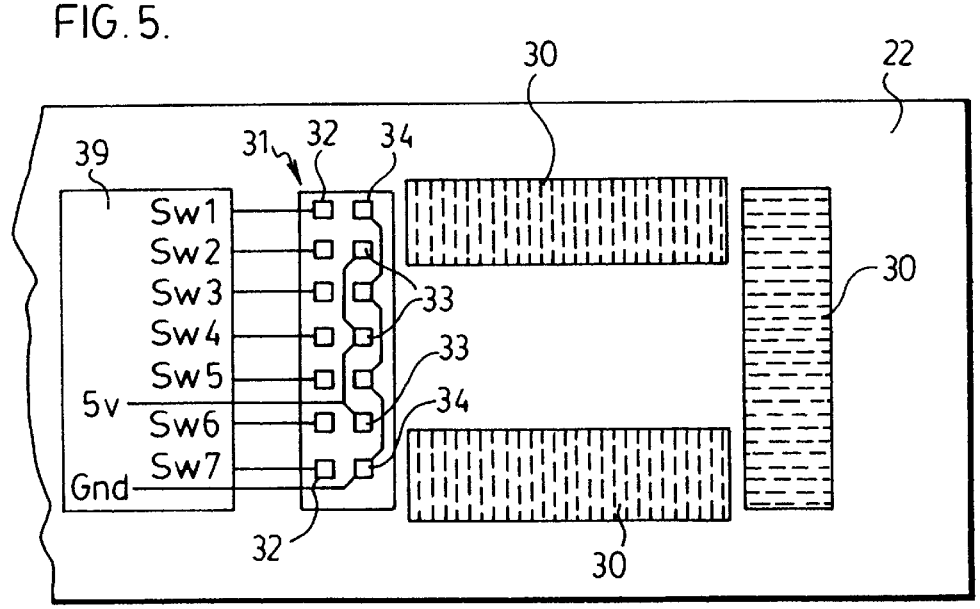
FIG. 5 is a top view showing various seals provided around an access port.

An electrical switch seal arrangement 28 is provided, as generally shown in FIGS. 4 and 5. The back housing 16, as shown in the sectional view of FIG. 4, has a series of zebra strip connectors generally shown as 30 in contact with the circuit board 22. The left hand side of the drawing shows two such zebra strip connectors which merely provide additional protection. Each zebra strip connector, as illustrated in FIG. 5, has alternating conducting and non conducting layers. The spacing of these layers which are extending horizontally is such that they will make contact with opposed terminals 32,33 or 34 provided on the circuit board 22 and these alternating layers separate adjacent terminals by at least one non conducting strip. Each side of the circuit board, adjacent the access port 18, has a series of logic switches formed by these terminals 32 and terminals 33 or 34. At the left of the circuit board, there are seven logic switches labelled SW1 through SW7. Terminals 34 are connected to the ground whereas terminal 33 are connected to a 5 volt supply. The zebra strip connector electrically connect each terminal 32 with opposed terminals 33 or 34. With this arrangement, logic switches SW7, SW5, SW3 and SW1 are shorted to ground. In contrast, the terminals 33 associated with SW2, SW4 and SW6, are connected to a 5 volt power source. As such, these switches are closed, i.e. the circuit is live. As can be appreciated, different logic patterns of ones (5V) and zeros (ground) can be detected by a processing arrangement 39 on the circuit board. The zebra strip connector is resilient and the pressure of mechanically joining the two housings is sufficient to ensure some compression of the zebra strip connector and a good electrical connection between the terminals 32, and opposed terminals 33 and 34. If the housing is opened or tampered with, at least some of the logic switches change status as the circuit will be broken.

FIG. 5 under each of the zebra strip connectors 30, has a similar switching arrangement 31 and thus, there is multiple switch protection on each side of the access port with some of the switches being connected to ground and some of the switches being connected to 5 volt power.

The fact that the zebra strip connectors have a series of conducting and non conducting layers, allows each of the switches to be isolated from the adjacent switch by at least one non conducting strip and preferably two non conducting strips and it also ensures that an effective electrical connection between terminals is provided without the need for precision location of the connectors.

The logic switches defined a logic high, in this case, 5 volts, and a logic low, i.e., ground. The multiple switches form a code of highs and lows used to detect a change in security status of the case.

The additional zebra strip connector shown as 30*a* in FIG. 4 provides enhanced protection. As can be appreciated, the zebra strip connectors 30 are located immediately adjacent the access port and if there is any attempt to pry up the housing adjacent the access port, this action will open or change the logic of at least some of the switches. Once the status of the switches is changed, the terminal will become inactive and therefore, even if the housing is broken into, the critical information will have been eliminated, or the device rendered inactive. Additional zebra strip connectors further away from the access port provide additional protection against unauthorized entry into the casing.

In some cases, it may be desirable to take security action if one switch changes (high security), however, in other cases, the security action may require two or more switches to change. For example, dropping of a terminal might momentarily change the status of one switch and it may be desirable to require change in status of more switches or changes in status for a certain time duration before taking security action. The present arrangement allows for these types of changes in design to customize the security for a particular application.

Although the security switch arrangement provides protection about the access port, it also provides protection against unauthorized opening of the casing by separating the housings.

The present invention allows the simple formation of terminals on a circuit board to provide switch information or switch logic through a multiple series of switches using a zebra strip connector having the alternating layers orientated by across the surface of the connector connections. The switches are isolated one from the other and it is not necessary to precisely locate the zebra strip connectors. The separation between the layers is such that any placement of a zebra strip connector in the housing and over the terminals will be sufficient to provide the necessary electrical connection and electrical isolation of terminals on the surface of the circuit board.

The terminal is designed using an outer housing to protect the components with a recessed covered access port to allow a user to insert or remove certain modules in electrical contact with the internal processing circuitry. Although the access part is within the housing, electrical security seals are provided about the access port. With this arrangement, the security of the terminal is uncompromised and the convenience of limited user access is realized.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A financial transaction terminal for cooperating with smart cards said terminal comprising a housing enclosing electronic circuitry and including a visual display and a keypad, said housing including a slot entry for receiving and forming an electronic circuit between a received smart card and said enclosed electronic circuitry, said keypad allowing a user to enter information into said financial terminal, and at least one accessible user secure module provided in an access port of said housing, said financial transaction terminal including an electrical switch seal arrangement biased by said housing to form an electrical seal at a plurality of points spaced about the perimeter of said access port whereby both access to said user secure module and security about said port are provided.

2. A financial transaction terminal as claimed in claim 1 wherein said at least one user secure module is defined by two security identity modules attached to a circuit board of said electronic circuitry.

3. A financial transaction terminal as claimed in claim 2 wherein said circuit board about said access port includes a series of connection terminals and said housing includes a zebra connector having alternating conducting and non conducting layers extending between said series of connection terminals and electrically connecting at least some of said terminals to form a security structure about said access port whereby said two security identity modules are readily accessible and said housing and the components of said terminal not exposed in said access port remain protected from unauthorized access through said access port.

4. A financial transaction terminal as claimed in claim 3 wherein said housing is a mechanically secured split housing having an electronic circuit for providing a signal if unauthorized entry to said terminal is attempted by releasing said split housing.

5. A financial transaction terminal as claimed in claim 4 wherein said electronic circuitry includes a circuit board having said two security modules attached to a surface thereof facing a base of said split housing, said circuit board having a border area surrounding said access port which border area is defined by said connection terminals.

6. A financial transaction terminal as claimed in claim 5 wherein said two security modules are miniature SIM card acceptors.

7. A financial transaction terminal as claimed in claim 5 wherein said two security modules are miniature secured application modules.

8. A financial transaction terminal as claimed in claim 5 wherein said terminal accepts debit or smart cards.

9. A financial transaction terminal comprising a housing enclosing an electronic circuitry and including a visual display and a keypad, said housing including at least one access port with said housing including an electronic seal about the perimeter of said port, said access port including an electrical component interface adapted to receive a replaceable electrical component and allow communication between said replaceable electrical component and said electronic circuitry, said electrical seal defining a coded switch having a known condition, said terminal including an arrangement for monitoring said coded switch and determining a change in the condition thereof, and a security system which deletes critical information upon determining a change in condition of said coded switch.

10. A financial transaction terminal as claimed in claim 9 wherein said electrical component interface is mounted on a circuit board which forms a part of said electronic circuitry.

11. A financial transaction terminal as claimed in claim 10 wherein only a limited portion of the back face of said circuit board is exposed within said access port and said electrical component interface is mounted on said back face.

12. A financial transaction terminal as claimed in claim 11 wherein said electrical component interface is adapted to receive at least one SIM module.

13. A financial transaction terminal as claimed in claim 11 wherein said electrical component interface is adapted to receive at least one SAM module.

14. A financial transaction terminal as claimed in claim 11 wherein said access port includes sufficient space for receiving two SAM modules and connecting said modules to said circuit board.

15. A financial transaction terminal as claimed in claim 12 wherein said electrical seal includes a series of opposed pairs of electrical contacts forming a code of circuits having one of two different states and a change in any state indicates a security breach.

16. A financial transaction terminal as claimed in claim 15 wherein said electrical seal generally surrounds said access port and said housing applies a pressure on at least one connector which connects opposed pairs of electrical contact points.

17. A financial transaction terminal as claimed in claim 16 wherein said connector is a series of alternating conducting and non conducting layers with at least one non conducting layer separating adjacent pairs of electrical contact points.

18. A financial transaction terminal as claimed in claim 15 wherein said electrical contact points are provided on said circuit board.

19. A financial transaction terminal as claimed in claim 18 wherein each side of said access port includes at least three pairs of electrical contact points.

20. A financial transaction terminal for cooperating with smart cards said terminal comprising a housing enclosing electronic circuitry and including a visual display and a keypad, said housing including a slot entry for receiving and forming an electronic circuit between a received smart card and said enclosed electronic circuitry, said keypad allowing a user to enter information into said financial terminal, and at least one accessible user secure module provided in an access port of said housing, said transaction terminal including an electrical switch seal arrangement about said accessible port, said electrical switch seal arrangement including a connector biased by said housing to maintain contact with paired electrical contacts associated with said electronic circuitry and thereby form a series of frangible electrical connections spaced about the perimeter of said access port whereby both access to said user secure module and security about said port are provided.

* * * * *